United States Patent
Furutani et al.

(10) Patent No.: US 12,099,550 B2
(45) Date of Patent: Sep. 24, 2024

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventors: Satoshi Furutani, Musashino (JP); Toshiki Shibahara, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 2 days.

(21) Appl. No.: 18/022,747

(22) PCT Filed: Sep. 16, 2020

(86) PCT No.: PCT/JP2020/035154
§ 371 (c)(1),
(2) Date: Feb. 23, 2023

(87) PCT Pub. No.: WO2022/059108
PCT Pub. Date: Mar. 24, 2022

(65) Prior Publication Data
US 2023/0325440 A1    Oct. 12, 2023

(51) Int. Cl.
*G06F 16/00* (2019.01)
*G06F 16/901* (2019.01)

(52) U.S. Cl.
CPC ............... *G06F 16/9024* (2019.01)

(58) Field of Classification Search
CPC ................................... G06F 16/9024
USPC ........................................ 707/798
See application file for complete search history.

(56) References Cited

U.S. PATENT DOCUMENTS

| | | | |
|---|---|---|---|
| 2017/0351681 A1* | 12/2017 | Bekas | G06F 16/24578 |
| 2020/0110761 A1* | 4/2020 | Cooper | G06F 16/28 |
| 2020/0313975 A1* | 10/2020 | Xia | H04L 41/142 |

OTHER PUBLICATIONS

Furutani et al., "Graph Signal Processing for Directed Graphs based on the Hermitian Laplacian", ECML/PKDD 2019, Sep. 16, 2019, 17 pages.

* cited by examiner

Primary Examiner — Vincent F Boccio
(74) Attorney, Agent, or Firm — XSENSUS LLP

(57) ABSTRACT

The detection device (10) has the signal processing unit (154) and the estimation unit (155). The signal processing unit (154) updates the evaluation value of the vertex of the graph by belief propagation, on the basis of the matrix generated using the argument on the complex plane expressing the direction of the side of the graph in which at least some vertices are labeled. The estimation unit (155) estimates a label of a vertex of the graph on the basis of the evaluation value.

20 Claims, 16 Drawing Sheets

Fig. 8

$$
20D \rightarrow \begin{bmatrix} 0 & 0 & 0 & 0 & 1 \\ 0 & 0 & 0 & 2 & 0 \\ 0 & 0 & 3 & 0 & 0 \\ 0 & 3 & 0 & 0 & 0 \\ 3 & 0 & 0 & 0 & 0 \end{bmatrix}
$$

$$
20A \rightarrow \begin{bmatrix} e^{i\theta} & 0 & 0 & 0 & 0 \\ 0 & e^{-i\theta} & 1 & 0 & 0 \\ e^{-i\theta} & e^{-i\theta} & 0 & 1 & 0 \\ e^{i\theta} & 0 & e^{i\theta} & e^{i\theta} & 0 \\ 0 & e^{-i\theta} & 0 & e^{-i\theta} & e^{-i\theta} \end{bmatrix}
$$

$$
20L \rightarrow \begin{bmatrix} -e^{i\theta} & 0 & 0 & 0 & 1 \\ 0 & e^{-i\theta} & -1 & 2 & 0 \\ e^{-i\theta} & -e^{-i\theta} & 3 & -1 & 0 \\ -e^{i\theta} & 3 & -e^{i\theta} & 0 & 0 \\ 3 & -e^{-i\theta} & 0 & -e^{-i\theta} & 0 \end{bmatrix}
$$

DETECTION DEVICE, DETECTION METHOD, AND DETECTION PROGRAM

CROSS-REFERENCE TO RELATED APPLICATION

The present application is based on PCT filing PCT/JP2020/035154, filed Sep. 16, 2020, the entire contents of which are incorporated herein by reference.

TECHNICAL FIELD

The present invention relates to a detection device, a detection method, and a detection program.

BACKGROUND ART

A method of extending graph signal processing, which has been mainly applied to an undirected graph, so as to be applicable to a directed graph has been proposed (e.g., refer to Non Patent Literature 1). For example, according to the method described in Non Patent Literature 1, graph signal processing such as graph Fourier transform, graph filtering, or graph wavelet transform can be performed on a directed graph.

Moreover, a technique called Sybil detection for detecting a malicious node included in a network by analyzing graph data based on an actual network is known. For example, Sybil detection is used for detection of a botnet, detection of a spam user in a social networking service (SNS), and the like.

CITATION LIST

Non Patent Literature

Non Patent Literature 1: S. Furutani et. al, "Graph Signal Processing for Directed Graphs based on the Hermitian Laplacian", ECML/PKDD 2019, June 2019.

SUMMARY OF INVENTION

Technical Problem

There are a plurality of techniques for Sybil detection, such as random walk and belief propagation (BP). On the other hand, a method of applying graph signal processing to Sybil detection has not been proposed so far. Therefore, it is difficult to interpret a plurality of Sybil detection techniques in a common signal processing framework.

For example, if Sybil detection techniques can be compared in a common signal processing framework, knowledge that cannot be obtained only by comparison in a superficial framework such as accuracy and extensibility can be obtained, and development of a new technique and improvement of an existing technique can be expected.

Solution to Problem

In order to solve the above-described problem and achieve the object, a detection device is characterized by including: an update unit that updates an evaluation value of a vertex of a graph by belief propagation, on the basis of a matrix generated by using an argument on a complex plane expressing a direction of a side of the graph in which at least some vertices are labeled; and an estimation unit that estimates a label of a vertex of the graph on the basis of the evaluation value.

Advantageous Effects of Invention

It is possible with the present invention to interpret a Sybil detection technique in a signal processing framework.

BRIEF DESCRIPTION OF DRAWINGS

FIG. 8 is a diagram for explaining a matrix generation method.

DESCRIPTION OF EMBODIMENTS

The following description will explain an embodiment of a detection device, a detection method, and a detection program according to the present application in detail with reference to the drawings. Note that the present invention is not limited to the embodiment described below.

Configuration of First Embodiment

Figure 1:
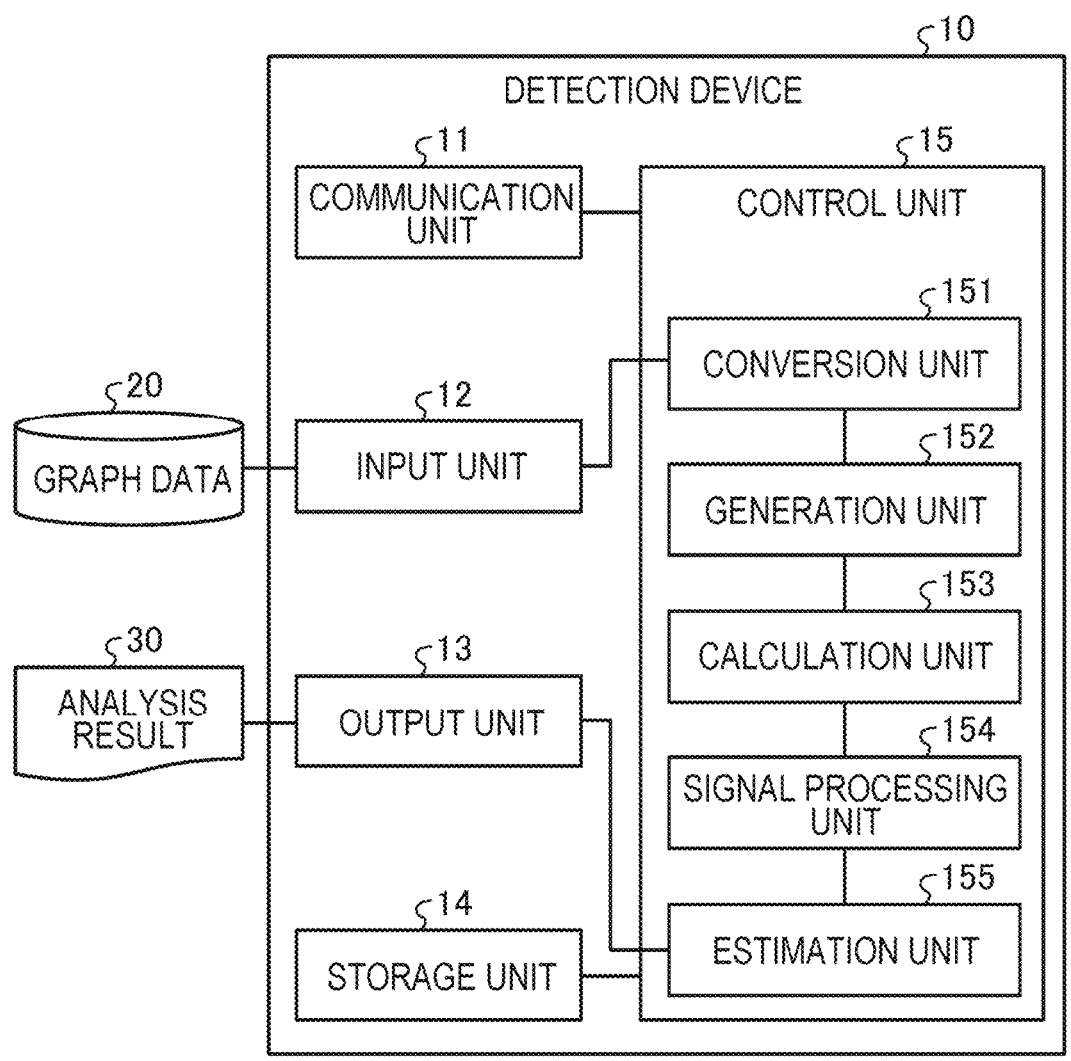
FIG. 1 is a diagram illustrating a configuration example of a detection device according to a first embodiment.

First, a configuration of a detection device according to a first embodiment will be described with reference to FIG. 1. FIG. 1 is a diagram illustrating an example of a configuration of a detection device according to the first embodiment. As illustrated in FIG. 1, a detection device 10 analyzes inputted graph data 20, and outputs a result of detection of a predetermined vertex as an analysis result 30.

Here, in the present embodiment, it is assumed that the detection device 10 detects Sybil. Sybil is a user created for malicious actions such as spam, click fraud, phishing, and impersonation to others, and is a security threat that deteriorates the quality of SNS or review sites.

In Sybil detection, a relationship between users may be focused. For example, on Twitter (registered trademark), there is little motivation for authorized users to connect with Sybil who sends spam or the like. Therefore, authorized users are expected to be closely connected with each other to form a community structure. On the other hand, since the number of followers strongly affects the influence and reliability of an account, Sybil is expected to be connected with Sybil to increase the number of followers and form a community structure. Therefore, it is considered that it is possible to distinguish between an authorized user and Sybil by appropriately separating a community structure of authorized users and a community structure of Sybil.

As a Sybil detection technique, a technique of setting a prior evaluation value on the basis of a known label given to a graph with a user as a vertex, and determining whether the user is Sybil or not on the basis of an evaluation value of an unknown vertex determined by locally updating and propagating the evaluation value of the vertex is known. Moreover, Non Patent Literature 1 discloses a method of applying graph signal processing to a directed graph.

Therefore, the detection device 10 of the present embodiment performs Sybil detection using graph signal processing. As a result, for example, the existing Sybil detection technique can be reinterpreted in a graph signal processing manner. Moreover, the reinterpretation result is considered to be useful for development of a new Sybil detection technique and improvement of an existing Sybil detection technique.

The Sybil detection problem described above can be regarded to be a semi-supervised problem that estimates unknown vertex labels from known vertex labels. At this time, it is assumed that a signal value +1 is assigned to a known vertex label in the case of Sybil and a signal value −1 is assigned in the case of an authorized user (not Sybil), and 0 is assigned to a vertex having an unknown label. Then, the Sybil detection problem can be interpreted as a problem of restoring a true graph signal when a graph signal in which some signal values are missing (0) is given.

In accordance with this observation, a Sybil detection technique based on belief propagation is formulated as filtering in the present embodiment. As a result, the existing Sybil detection technique can be integrated and reinterpreted in a graph signal processing manner.

Figure 2:
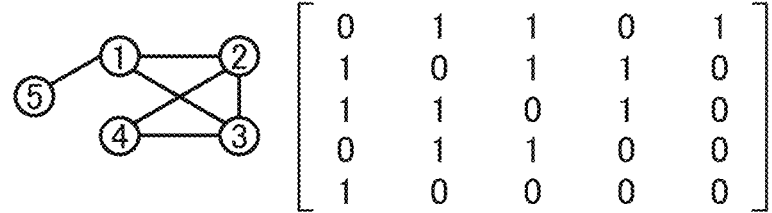
FIG. 2 is a diagram illustrating an example of representation of an undirected graph.
Figure 3:
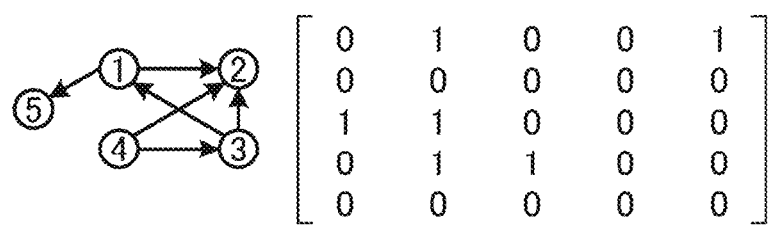
FIG. 3 is a diagram illustrating an example of representation of a directed graph.

The graph data 20 is data representing a graph by a predetermined method. In the present embodiment, the graph data 20 is represented by an adjacency matrix. For example, an undirected graph is expressed by an adjacency matrix as illustrated in FIG. 2. FIG. 2 is a diagram illustrating an example of representation of an undirected graph. Moreover, the directed graph is expressed by an adjacency matrix as illustrated in FIG. 3. FIG. 3 is a diagram illustrating an example of representation of a directed graph.

Here, an adjacency matrix representing the graph data 20 is defined as follows. First, in a case where there is no side between vertices of the graph, the component of the adjacency matrix corresponding to the side is set to 0. Next, in a case where an undirected side exists between vertices of the graph, the component of the adjacency matrix corresponding to the side is set to 1. Moreover, in a case where there is a directed side from an arbitrary vertex i to a vertex j of the graph, the (i, j) component of the adjacency matrix is set to 1, and the (j, i) component is set to 0.

For example, in the undirected graph of FIG. 2, there are undirected sides between vertices 1 and 2. Therefore, the (1, 2) component and the (2, 1) component of the adjacency matrix in FIG. 2 are 1. That is, in the adjacency matrix of the undirected graph, the arbitrary (i, j) component and the (j, i) component have the same value. As described above, the adjacency matrix representing the undirected graph is a symmetric matrix.

Moreover, in the directed graph of FIG. 3, for example, since there is a directed side from vertex 1 to vertex 2 between vertices 1 and 2, the (1, 2) component of the matrix is 1. On the other hand, since there is no directed side from vertex 2 to vertex 1, the (2, 1) component is 0. As described above, the adjacency matrix representing the directed graph is an asymmetric matrix.

In general, an asymmetric matrix is difficult to handle algebraically compared to a symmetric matrix, and therefore, many graph analysis techniques including graph signal processing are limited in application to an undirected graph. Note that the graph data 20 may be any data as long as the data expresses a graph.

For example, the graph data 20 may represent a follow/follower relationship (side) of a user (vertex) on Twitter (registered trademark) as a graph, or may represent a function calling relationship in a malware execution code as a graph. Moreover, since the analysis technique of the present embodiment is obtained by extending the graph analysis technique of the undirected graph to the directed graph, the analysis is also applicable to an undirected graph.

The detection device 10 can execute Sybil detection on a directed graph. For example, the analysis result 30 is a label indicating whether a user is Sybil or not for each user corresponding to each vertex of the graph data 20.

Here, each unit of the detection device 10 will be described. As illustrated in FIG. 1, the detection device 10 has a communication unit 11, an input unit 12, an output unit 13, a storage unit 14, and a control unit 15.

The communication unit 11 performs data communication with other devices via a network. For example, the communication unit 11 is a network interface card (NIC). The input unit 12 accepts an input of data from a user. The input unit 12 is, for example, an input device such as a mouse or a keyboard. The output unit 13 outputs data by displaying a screen or the like. The output unit 13 is, for example, a display device such as a display.

The storage unit 14 is a storage device such as a hard disk drive (HDD), a solid state drive (SSD), or an optical disk. Note that the storage unit 14 may be a data-rewritable semiconductor memory such as a random access memory (RAM), a flash memory, or a non-volatile static random access memory (NVSRAM). The storage unit 14 stores an operating system (OS) and various programs to be executed by the detection device 10.

The control unit 15 controls the entire detection device 10. The control unit 15 is, for example, an electronic circuit such as a central processing unit (CPU) or a micro processing unit (MPU), or an integrated circuit such as an application specific integrated circuit (ASIC) or a field programmable gate array (FPGA). Moreover, the control unit 15 has an internal memory for storing programs and control data that define various processing procedures, and executes each processing using the internal memory. Moreover, the control unit 15 functions as various processing units by various programs operating. For example, the control unit 15 has a conversion unit 151, a generation unit 152, a calculation unit 153, a signal processing unit 154, and an estimation unit 155.

Figure 4:
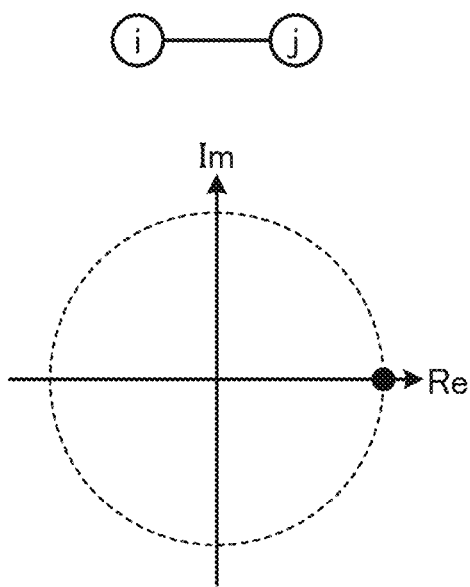
FIG. 4 is a diagram for explaining a method of converting a side.
Figure 5:
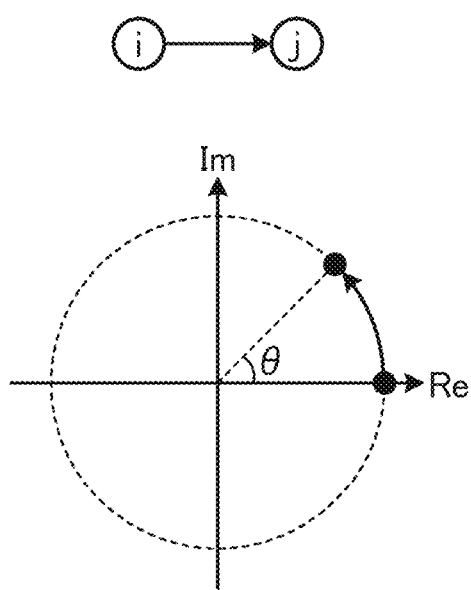
FIG. 5 is a diagram for explaining a method of converting a side.
Figure 6:
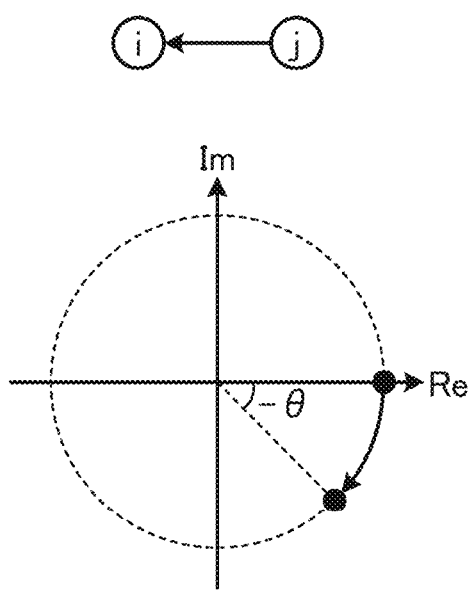
FIG. 6 is a diagram for explaining a method of converting a side.

The conversion unit 151 converts the direction of a side between vertices of the graph into an argument (phase) on a complex plane. For example, the conversion unit 151 converts the direction of a side into a first angle in a case where the direction of the side between vertices of the graph is the first direction, converts the direction of a side into an angle obtained by inverting the sign of the first angle in a case where the direction of the side is opposite to the first direction, and converts the direction of a side into 0 (angle) in a case where the side has no direction. Here, a method of conversion by the conversion unit 151 will be described with reference to FIGS. 4 to 6. FIGS. 4 to 6 are diagrams for explaining a method of converting a side.

First, it is assumed that a point having an absolute value of 1 and an argument of 0 on a complex plane is given as a reference point. As illustrated in FIG. 4, the conversion unit 151 does not rotate the argument of the reference point on the complex plane in a case where there is an undirected side between vertices i and j, that is, in a case where a directed side from the vertex i to the vertex j and a directed side from the vertex j to the vertex i simultaneously exist. That is, the reference point indicates that an undirected side exists or directed sides in both directions simultaneously exist between the vertices i and j.

As illustrated in FIG. 5, the conversion unit 151 rotates the argument of the reference point by θ in the positive direction on the complex plane in a case where a directed side from the vertex i to the vertex j exists between the vertices i and j. Conversely, the conversion unit 151 rotates the argument of the reference point by θ in the negative direction on the complex plane in a case where a directed side from the vertex j to the vertex i exists between the vertices i and j as illustrated in FIG. 6. In this case, the direction from the vertex i to the vertex j is an example of the first direction. Moreover, θ is an example of the first angle. Moreover, θ can be a fixed value such as π/4.

The operation by the conversion unit 151 mentioned above can be described as a function γ from a side set to a primary unitary group as expressed in Formula (1). Here, in Formula (1), i in an italic font is an index of a vertex, and i in a normal font is an imaginary unit.

[Math. 1]

$$\gamma(i, j; \theta) = e^{i\theta(a_{ij} - a_{ji})} \quad (1)$$

$$a_{ij} = \begin{cases} 1 & i \to j \\ 0 & \text{otherwise} \end{cases}$$

Note that the definition of the function γ is not limited to that of Formula (1). For example, the function γ may be defined in the form of γ=α+iβ by explicitly dividing the real part and the imaginary part. Moreover, the function γ may be defined as a quadratic special orthogonal group, that is, as γ=diag(α, β) as a 2×2 matrix.

The generation unit 152 generates a Hermitian matrix expressing the relationship between vertices of the graph by using the argument converted by the conversion unit 151. For example, the generation unit 152 generates a matrix, in which each row and each column correspond to each vertex of the graph and which is obtained by subtracting a matrix in which a component having a side between corresponding vertices has an argument converted by the conversion unit 151 and the absolute value is a constant complex number, from an order matrix of the graph. In this case, the components of the matrix may be the values obtained by the function γ mentioned above.

Here, in graph signal processing, a graph is generally represented using a matrix called a graph Laplacian. The graph Laplacian can be defined using an adjacency matrix and an order matrix. The order of the graph expresses the number of sides extending from the vertex.

Figure 7:
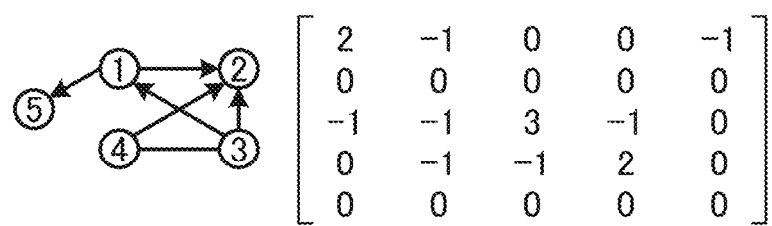
FIG. 7 is a diagram for explaining a graph Laplacian.

The graph Laplacian will be described with reference to FIG. 7. FIG. 7 is a diagram for explaining the graph Laplacian. For example, in the graph of FIG. 7, since two sides extend from vertex 1 to vertex 2 and vertex 5, the order of vertex 1 is 2. The order matrix is a matrix in which the orders of the respective vertices are arranged as diagonal components. In general, if the adjacency matrix is A and the order matrix is D, the conventional graph Laplacian $L_{prior}$ can be written as $L_{prior}$=D−A. As illustrated in FIG. 7, the adjacency matrix of the directed graph is an asymmetric matrix, and similarly, the graph Laplacian of the directed graph is also an asymmetric matrix.

The generation unit 152 generates a matrix using the converted adjacency matrix and order matrix. The converted adjacency matrix is a matrix in which each component of the adjacency matrix is represented using the argument converted by the conversion unit 151. FIG. 8 is a diagram for explaining a matrix generation method.

As illustrated in FIG. 3, a directed side from vertex 1 to vertex 2 exists between vertices 1 and 2, for example, in the inputted directed graph. Therefore, as illustrated in FIG. 8, the (1, 2) component of the matrix 20A that is the converted adjacency matrix is $e^{i\theta}$, and the (2, 1) component is $e^{-i\theta}$. The generation unit 152 obtains a matrix 20L by subtracting the matrix 20A from the matrix 20D that is the order matrix.

The (1, 2) component and the (2, 1) component of the matrix 20L are $-e^{i\theta}$ and $-e^{-i\theta}$, respectively. Moreover, since an undirected side exists between vertices 3 and 4 of the graph, both the (3, 4) component and the (4, 3) component of the matrix 20L are −1. Note that, since the direction of the side is converted into the argument on the complex plane in the conversion unit 151, the order expressed in the matrix 20D is calculated ignoring the direction of the side of the directed graph.

Here, a matrix in which the (i, j) component and the (j, i) component of the matrix are complex conjugates for each other is referred to as a Hermitian matrix. Apparently, the matrix 20L in FIG. 8 is a Hermitian matrix. Therefore, hereinafter, the matrix generated by the generation unit 152 will be referred to as a Hermitian Laplacian and is denoted by L.

The calculation unit 153 calculates an eigenvector of the Hermitian matrix generated by the generation unit 152. Moreover, the signal processing unit 154 regards the eigenvector calculated by the calculation unit 153 as a Fourier basis of the graph Laplacian, and performs graph signal processing.

For example, the signal processing unit 154 performs graph Fourier transform, graph filtering, or graph wavelet transform using eigenvectors. Moreover, the eigenvector calculated by the calculation unit 153 may be used in Sybil detection described later.

Here, the graph Fourier transform in the undirected graph is defined by regarding an eigenvector v of the graph Laplacian $L_{prior}$ as a Fourier basis. When a matrix in which eigenvectors v are arranged in columns is V, graph Fourier transform for an arbitrary graph signal f is defined by ^f=V*f (where ^f means that ^ is attached directly above f, and * indicates complex conjugate transposition or association). Most elemental techniques of graph signal processing in an undirected graph are based on this graph Fourier transform.

The signal processing unit 154 extends the graph Fourier transform in a conventional undirected graph and applies the same to a directed graph. The signal processing unit 154 executes two procedures of spectral decomposition of the Hermitian Laplacian L and extension of graph Fourier transform to a directed graph.

First, since L is a Hermitian matrix, the signal processing unit 154 performs spectral decomposition of L using a matrix Λ in which eigenvalues λ of L are arranged in diagonal components, and a unitary matrix U in which eigenvectors u are arranged in columns as expressed in Formula (2). Note that the eigenvector u is calculated by the calculation unit 153.

[Math. 2]

$$\mathcal{L} = U\Lambda U^* \tag{2}$$

Moreover, the signal processing unit 154 can perform graph Fourier transform on a directed graph for an arbitrary graph signal f as in Formula (3) by regarding the eigenvector u as a Fourier basis.

[Math. 3]

$$\hat{f} = U^* f \tag{3}$$

Note that, although the extension method of graph Fourier transform has been described here, the signal processing unit 154 can also extend the elemental technology in graph signal processing such as graph filtering or graph wavelet transform to a directed graph in a similar manner.

Figure 9:
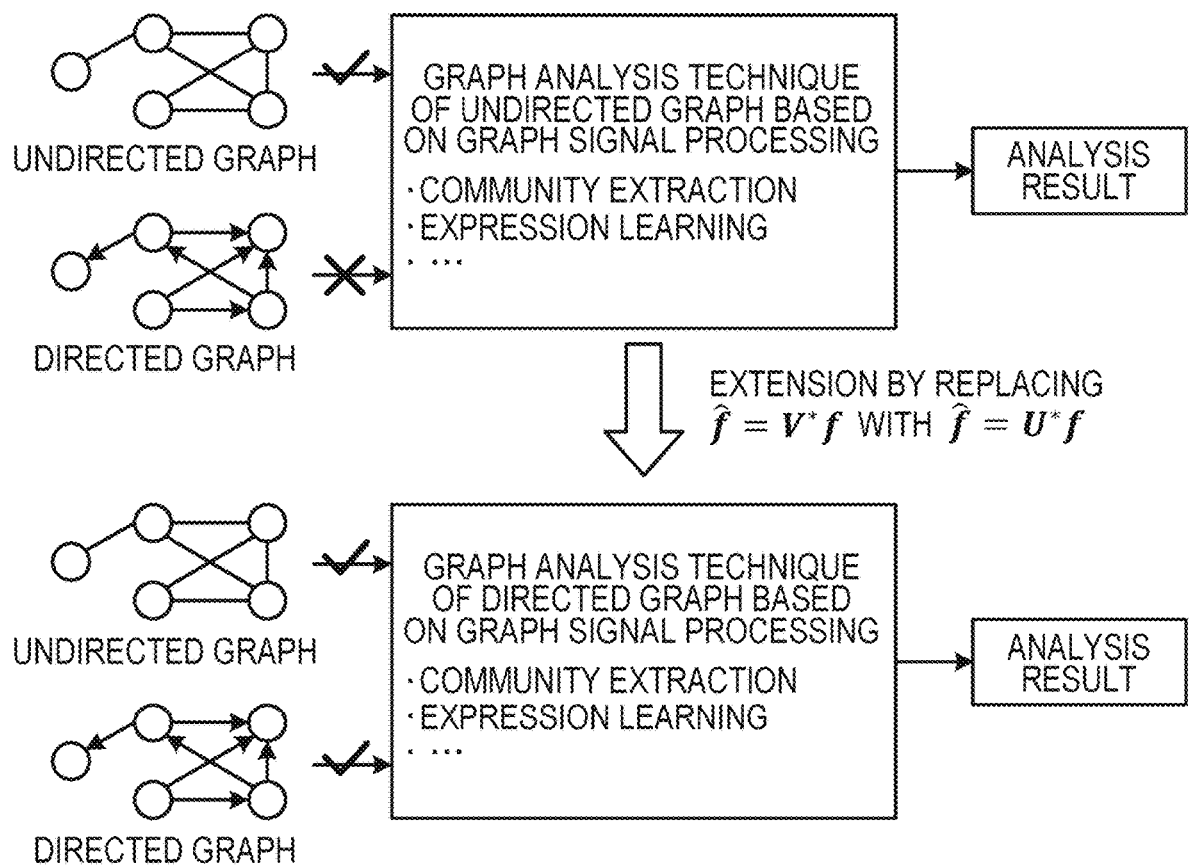
FIG. 9 is a diagram for explaining extension of a graph analysis technique.

FIG. 9 is a diagram for explaining extension of a graph analysis technique. As illustrated in FIG. 9, it can be said that the signal processing unit 154 replaces existing graph Fourier transform ˆf=V*f of an undirected graph with graph Fourier transform ˆf=U*f of a directed graph. As a result, the signal processing unit 154 can easily extend the graph analysis technique for an existing undirected graph to a directed graph.

In the present embodiment, the signal processing unit 154 performs graph signal processing for Sybil detection. Here, it is assumed that each vertex of the graph data 20 corresponds to an SNS user. Moreover, it is assumed that at least some vertices of the graph data 20 are labeled.

As described above, in the present embodiment, a Sybil detection technique based on belief propagation is formulated as filtering by graph signal processing. Here, the prior evaluation value of a vertex labeled as Sybil is set to +1, the prior evaluation value of a vertex labeled as an authorized user (not Sybil) is set to −1, and the prior evaluation value of a vertex whose label is unknown is set to 0.

First, in Sybil detection based on belief propagation, a statistic called a message is updated as in Formula (4).

[Math. 4]

$$\mu_{ij}^{(t+1)}(x_j) \propto \sum_{x_i} \psi_{ij}(x_i, x_j)\psi_i(x_i) \prod_{k \in \partial_i \setminus \{j\}} \mu_{ki}^{(t)}(x_i) \tag{4}$$

Here, $x_i = \pm 1$ is a random variable, and expresses whether the vertex i is Sybil or not (for example, $x_i = +1$ is satisfied if the vertex i is Sybil). The $\mu_{ij}^{(t)}$ is the message from vertex i to vertex j at step t. However, it is assumed that normalization is performed as $\Sigma_{x_j} \mu_{ij}(x_j) = 1$. Moreover, $\psi_{ij}(x_i, x_j)$ is a potential function of a vertex and a side, respectively. The evaluation value (probability) $p_i(x_i)$ of the vertex i is calculated by Formula (5) using the converged message $\mu_{ij}^\infty(x_j)$.

[Math. 5]

$$p_i(x_i) \propto \psi_i(x_i) \prod_{k \in \partial_i} \mu_{ki}^\infty(x_i) \tag{5}$$

Belief propagation-based approaches are known to be more accurate and noise-robust compared to random walk-based approaches. On the other hand, in belief propagation, it has been proved that the message update algorithm converges in a case where there is no loop in the graph and in a case where there is one loop. However, in a case where there are two or more loops, there is a problem that there is no guarantee that the message update algorithm converges.

Figure 10:
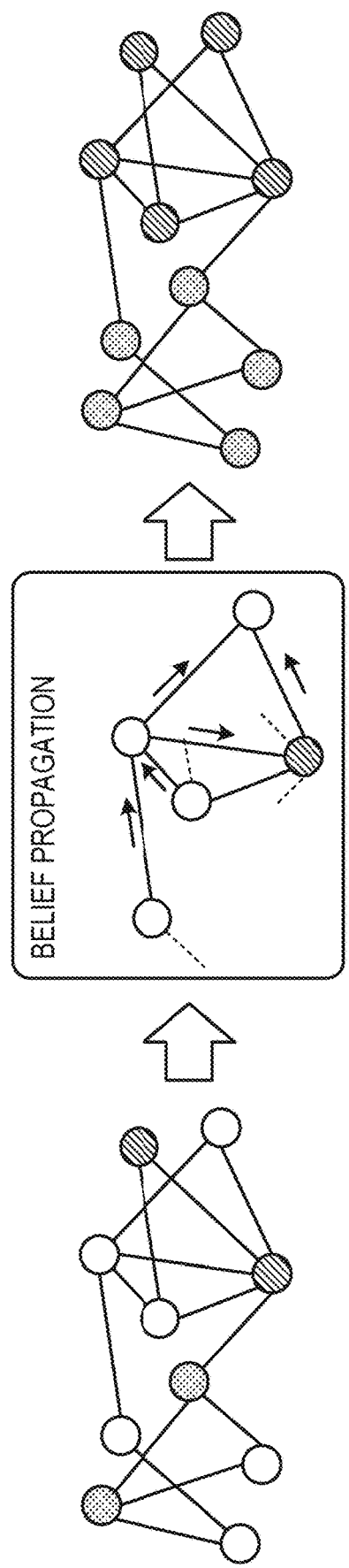
FIG. 10 is a diagram for explaining belief propagation.

FIG. 10 is a diagram for explaining belief propagation. As illustrated in FIG. 10, in belief propagation, the evaluation value is updated on the basis of the message between vertices. Note that the technique of belief propagation described here is an example, and the present embodiment can be applied to various techniques to which belief propagation is applied.

Here, in a case where the random variable is binary as $x_i = \pm 1$, the message $\mu_{ij}(x)$ can be parameterized as in Formula (6) using a single real number v.

[Math. 6]

$$v_{ij} := \tanh^{-1}(\mu_{ij}(x_j = +1) - \mu_{ij}(x_j = -1)) \tag{6}$$

At this time, the update formula of belief propagation can be strictly rewritten as in Formula (7).

[Math. 7]

$$\tanh(v_{ij}^{new}) = \tanh(\beta J_{ij})\tanh(\beta h_{i\setminus j}) \tag{7}$$

However, $\beta h_{i\setminus j} := \beta \theta_i + \sum_{k \in \partial_i \setminus j} v_{ki}$ is a cavity field.

Here, an operator BP: $v \mapsto v_{new}$ (where $\mapsto$ expresses mapping) satisfying $v^{new} = BP(v)$ is considered, and linearization is performed around an obvious fixed point $v_{ij} = v^*(\forall (i,j) \in E)$ to obtain Formula (8).

[Math. 8]

$$\frac{\partial v_{ij}^{new}}{\partial v_{kl}} = \frac{1 - \tanh^2(\beta h_{i\setminus j})}{1 - \tanh^2(\beta J_{ij})\tanh^2(\beta h_{i\setminus j})} \tanh(\beta J_{ij}) 1_{\partial_{i\setminus j}}(k)\delta_{i,l} \tag{8}$$

Here, $1_X(x)$ is an indication function such that $1_X(x)=1$ is satisfied when $x \in X$ is satisfied, and $1_X(x)$ becomes 0 when x is not included in X. Here, a matrix B defined by Formulas (9) and (10) is considered.

[Math. 9]

$$B = [B_{ij,kl}] \in \mathbb{R}^{2|E| \times 2|E|} \tag{9}$$

[Math. 10]

$$B_{ij,kl} := \xi_{ij,kl} \delta_{il}(1-\delta_{jk}) \tag{10}$$

If $\xi_{ij,kl}$ is a coefficient of $\partial v_{ij}^{new}/\partial v_{kl}$, the matrix B coincides with a Jacobian matrix of Formula (11).

[Math. 11]

$$B_{ij\varphi'}(v) = \left[\frac{\partial v_{ij}^{new}}{\partial v_{kl}}\right] \quad (11)$$

Figure 11:
FIG. 11 is a diagram for explaining a graph having a directed side as a vertex.

The matrix B is called a non-backtracking operator, and represents a connection relationship of directed sides for which backtracking on the graph is prohibited. FIG. 11 is a diagram for explaining a graph having a directed side as a vertex. In the example in FIG. 11, directed sides $e_1$ and $e_2$ of the directed graph are vertices on the directed side graph.

Figure 12:
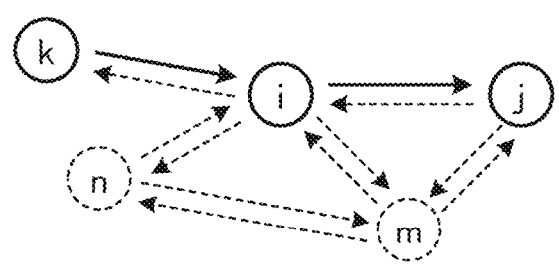
FIG. 12 is a diagram for explaining a non-backtracking operator.
Figure 13:
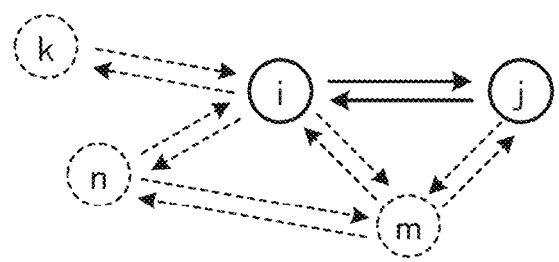
FIG. 13 is a diagram for explaining a non-backtracking operator.

FIGS. 12 and 13 are diagrams for explaining a non-backtracking operator. As illustrated in FIG. 12, Formula (10) is non-zero in a case where two directed sides are continuous. On the other hand, as illustrated in FIG. 13, the backtracking connection relationship becomes zero by $(1-\delta_{jk})$ in Formula (10).

The matrix B can be considered as an adjacency matrix (here, connection corresponding to backtracking is excluded) expressing a directed side graph H=(→E, F) with the directed side e∈→E of the directed graph G= (V, →E) (→E means that → is located directly above E) as a vertex.

It can be seen from Formula (10) that the weights $\xi_{ij,kl}$ of the matrix B depends on the message v via $\beta h_{Nj}$. This means that the weight of the side of the directed side graph H=(→E, F) adaptively changes every time the message is updated, and analysis is extremely difficult.

Therefore, the potential function of the vertex is assumed as $\psi_i(x_i)=1 \cdot \forall i$. This corresponds to ignoring information of known vertex labels and assuming that all potential functions are equal. With this assumption, the components of the matrix B can be written in a message-independent manner, such as $B_{ij,kl}=\tanh(\beta J_{ij})\delta_{il}(1-\delta_{i1})$.

Assuming that $v^{(t)} \square R^{2|E|}$ is a vector in which messages are arranged, the message update formula can be written as Formula (12) using B.

[Math. 12]

$$v^{(t+1)} = Bv^{(t)} = B^{t+1}v^{(0)} \quad (12)$$

Formula (12) is an operation of enlarging the initial value $v^{(0)}$ by exponentiation, and can be regarded as a high-pass filter. Moreover, when the message v converges, the expected value $m_i = p_i(x_i=+1) - p_i(x_i=-1)$ of the random variable $x_i$ can be calculated as $m_i = \Sigma_{k \square \partial i} w_{ik} v_{ki}^{\infty}$.

Therefore, the Sybil detection technique based on belief propagation can be interpreted as an operation of pooling (aggregating) messages after high-pass filtering of the initial value $v^{(0)}$, on the assumption that the potential functions of the vertices are all equal.

The signal processing unit 154 updates the evaluation value of the vertex of the graph by belief propagation, on the basis of the matrix generated using the argument on the complex plane expressing the direction of the side of the graph in which at least some vertices are labeled.

For example, the signal processing unit 154 updates the evaluation value on the basis of a message obtained by updating a vector in which messages are arranged in belief propagation using a matrix expressing a connection relationship of the directed sides of the graph. That is, the signal processing unit 154 updates the evaluation value on the basis of the message calculated using Formula (12).

Moreover, the signal processing unit 154 can update the evaluation value on the basis of a message obtained by pooling the initial value after high-pass filtering, on the assumption that all the potential functions of the vertices are equal.

The estimation unit 155 estimates a label of a vertex of the graph on the basis of the evaluation value. For example, the estimation unit 155 can estimate a vertex whose evaluation value is equal to or larger than a predetermined threshold value larger than 0 as Sybil.

Processing of First Embodiment

Figure 14:
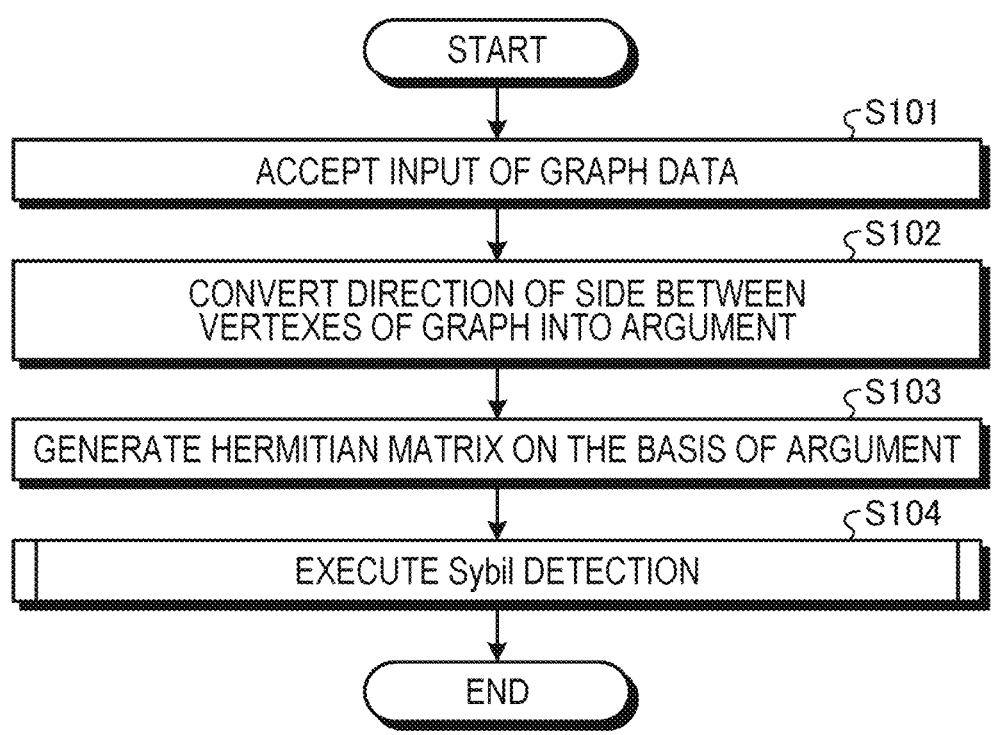
FIG. 14 is a flowchart illustrating a flow of processing of a detection device.

FIG. 14 is a flowchart illustrating a flow of processing of the detection device. As illustrated in FIG. 14, the detection device 10 first accepts an input of graph data 20 (step S101). It is assumed that a label indicating whether the user is Sybil or not is applied to each of some vertices of the graph data 20.

Next, the detection device 10 converts the direction of the side between vertices of the graph into an argument (step S102). For example, the detection device 10 converts a side in a certain direction into an angle θ, and converts a side in a direction opposite to the certain direction into an angle −θ.

The detection device 10 generates a Hermitian matrix on the basis of the argument (step S103). For example, the detection device 10 generates a Hermitian matrix by subtracting the converted adjacency matrix from the order matrix. Here, the detection device 10 executes Sybil detection (step S104).

Figure 15:
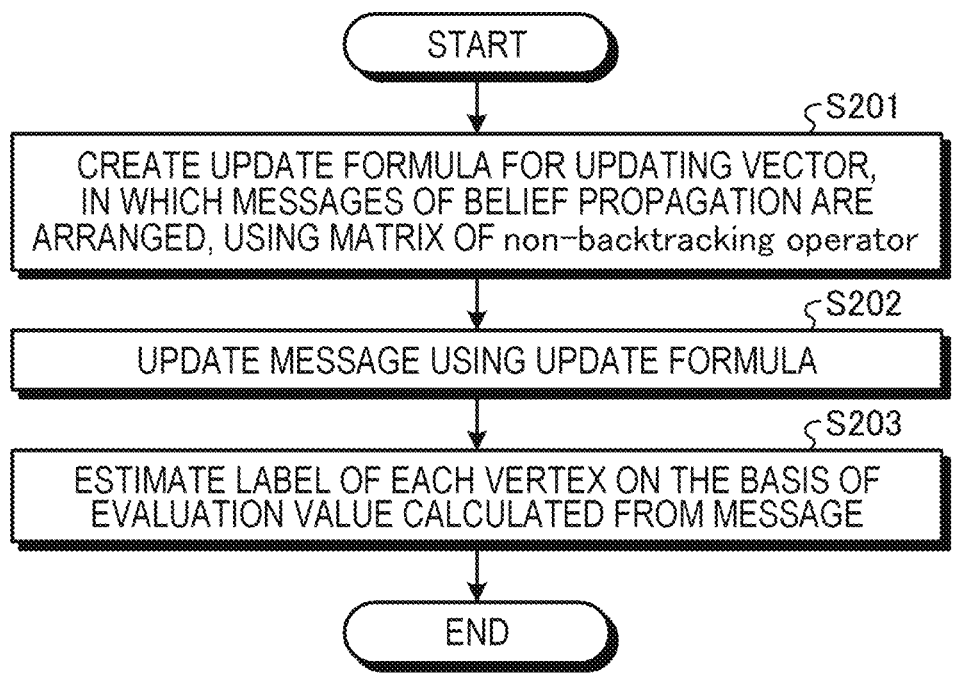
FIG. 15 is a flowchart illustrating a flow of processing of detecting Sybil.

FIG. 15 is a flowchart illustrating a flow of processing of detecting Sybil. The process in FIG. 15 corresponds to step S104 in FIG. 14. First, the detection device 10 creates an update formula for updating a vector, in which messages of belief propagation are arranged, using a matrix of the non-backtracking operator (step S201). Next, the detection device 10 updates the message using the update formula (step S202). Then, the detection device 10 estimates a label of each vertex on the basis of the evaluation value calculated from the message (step S203).

Effects of First Embodiment

As described above, the detection device 10 of the first embodiment has the signal processing unit 154 and the estimation unit 155. The signal processing unit 154 updates the evaluation value of the vertex of the graph by belief propagation, on the basis of the matrix generated using the argument on the complex plane expressing the direction of the side of the graph in which at least some vertices are labeled. The estimation unit 155 estimates a label of a vertex of the graph on the basis of the evaluation value. In this manner, the detection device 10 applies the graph signal processing to new year propagation. Therefore, it is possible with the present embodiment to interpret the Sybil detection technique in a signal processing framework.

The signal processing unit 154 updates the evaluation value on the basis of the message obtained by updating the vector, in which the messages are arranged in belief propagation, using the matrix expressing the connection relationship of the directed sides of the graph. As a result, the graph signal processing can be easily applied to belief propagation.

On the assumption that all the potential functions of the vertices are equal, the signal processing unit 154 updates the evaluation value on the basis of a message obtained by pooling the initial value after high-pass filtering. This allows belief propagation to be interpreted as graph signal processing.

In the present embodiment, the Sybil detection technique based on belief propagation is filtered on the directed side graph H instead of the original graph G. In the case of normal random walk, once a vertex having a large order is reached, it takes time to exit from the vicinity region, and as a result, the stationary distribution is localized at a vertex having a high order.

On the other hand, in the case of random walk by the matrix B as in the present embodiment, the probability of staying in the vicinity of a vertex having a larger order decreases due to prohibition of backtracking. In fact, it is known that the mixing rate of random walk in which backtracking is prohibited is faster than that of normal random walk. Therefore, Sybil detection based on belief propagation can be expected to function even in a graph with extreme deviation in the order.

[System Configuration Etc.]

Moreover, each component of each illustrated device is functionally conceptual, and does not necessarily need to be physically configured as illustrated. That is, a specific form of distribution and integration of each device is not limited to the illustrated form, and all or a part thereof can be functionally or physically distributed or integrated in an arbitrary unit according to various loads, usage conditions, and the like. Furthermore, all or an arbitrary part of each processing function performed in each device can be implemented by a CPU and a program analyzed and executed by the CPU, or can be implemented as hardware by wired logic.

Moreover, among the processes described in the present embodiment, all or some of the processes described as being automatically performed can be manually performed, or all or some of the processes described as being manually performed can be automatically performed by a known method. In addition, the processing procedure, the control procedure, the specific name, and the information including various data and parameters illustrated in the above document or the drawings can be arbitrarily changed unless otherwise specified.

[Program]

As an embodiment, the detection device 10 can be implemented by installing a detection program for executing the detection processing mentioned above as package software or online software in a desired computer. For example, by causing the information processing device to execute the detection program mentioned above, it is possible to cause the information processing device to function as the detection device 10. The information processing device mentioned here includes a desktop or notebook personal computer. Moreover, the information processing device includes mobile communication terminals such as a smartphone, a mobile phone, and a personal handyphone system (PHS), and further includes slate terminals such as a personal digital assistant (PDA).

Moreover, the detection device 10 can also be implemented as a detection server device that uses a terminal device used by a user as a client and provides the client with a service related to the detection processing mentioned above. For example, the detection server device is implemented as a server device that accepts graph data as an input and provides a vertex that is Sybil. In this case, the detection server device may be implemented as a Web server, or may be implemented as a cloud that provides a service related to the detection processing mentioned above by outsourcing.

Figure 16:
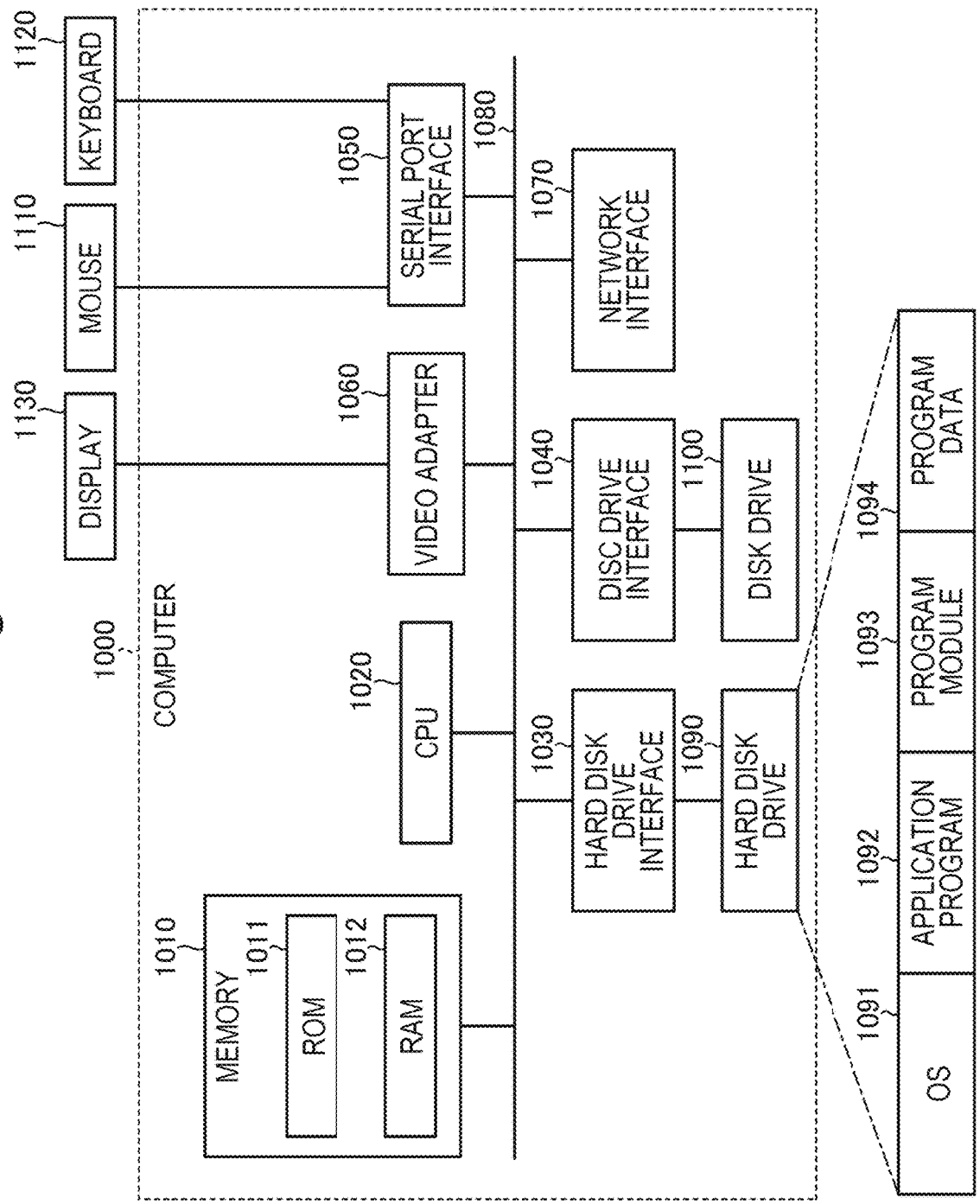
FIG. 16 is a diagram illustrating an example of a computer that executes a detection program.

FIG. 16 is a diagram illustrating an example of a computer that executes a detection program. A computer 1000 has, for example, a memory 1010 and a CPU 1020. The computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected with a hard disk drive 1090. The disk drive interface 1040 is connected with a disk drive 1100. For example, a removable storage medium such as a magnetic disk or an optical disk is inserted into the disk drive 1100. The serial port interface 1050 is connected with, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, a program that defines each processing of the detection device 10 is implemented as the program module 1093 in which codes executable by a computer are described. The program module 1093 is stored in, for example, the hard disk drive 1090. For example, the program module 1093 for executing processing similar to the functional configuration in the detection device 10 is stored in the hard disk drive 1090. Note that the hard disk drive 1090 may be replaced with an SSD.

Moreover, the setting data used in the processing of the above-described embodiment is stored in, for example, the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary, and executes the processing of the above-described embodiment.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), etc.). Then, the program module 1093 and the program data 1094 may be read by the CPU 1020 from the another computer via the network interface 1070.

REFERENCE SIGNS LIST

10 Detection device
11 Communication unit
12 Input unit
13 Output unit
14 Storage unit
15 Control unit
20 Graph data
20A, 20D, 20L Matrix
30 Analysis result
151 Conversion unit
152 Generation unit
153 Calculation unit
154 Signal processing unit
155 Estimation unit

The invention claimed is:
1. A detection device, comprising:
update circuitry configured to update an evaluation value of a vertex of a graph by belief propagation, on a basis of a matrix generated by using an argument on a complex plane expressing a direction of a side of the graph in which at least some vertices are labeled; and estimation circuitry configured to estimate a label of a vertex of the graph on a basis of the evaluation value, wherein the update circuitry updates the evaluation value on a basis of a message obtained by pooling an initial value after high-pass filtering, on an assumption that all potential functions of vertices are equal.

2. The detection device according to claim 1, wherein: the update circuitry updates the evaluation value on a basis of a message obtained by updating a vector, in which messages are arranged in belief propagation, using a matrix expressing a connection relationship of directed sides of a graph.

3. The detection device according to claim 1, wherein the matrix is a graph Laplacian matrix.

4. The detection device according to claim 1, wherein an order of the graph determines a number of sides extending from the vertex.

5. The detection device according to claim 1, wherein each vertex of the graph corresponds to a user.

6. The detection device according to claim 5, wherein the estimation circuitry determines whether a user corresponding to the vertex is a Sybil.

7. The detection device according to claim 1, wherein the update of the evaluation value of the vertex of the graph by belief propagation is based, at least in part, on messaging among vertexes.

8. A detection method, comprising:
updating an evaluation value of a vertex of a graph by belief propagation, on a basis of a matrix generated using an argument on a complex plane expressing a direction of a side of the graph in which at least some vertices are labeled; and
estimating a label of a vertex of the graph on a basis of the evaluation value,
wherein the updating updates the evaluation value on a basis of a message obtained by pooling an initial value after high-pass filtering, on an assumption that all potential functions of vertices are equal.

9. A non-transitory computer readable medium including a detection program for causing a computer to perform the method of claim 8.

10. The non-transitory computer-readable medium according to claim 9, wherein an order of the graph determines a number of sides extending from the vertex.

11. The non-transitory computer-readable medium according to claim 9, wherein the matrix is a graph Laplacian matrix.

12. The non-transitory computer-readable medium according to claim 9, wherein each vertex of the graph corresponds to a user.

13. The non-transitory computer-readable medium according to claim 12, wherein the estimation circuitry determines whether a user corresponding to the vertex is a Sybil.

14. The non-transitory computer-readable medium according to claim 9, wherein the update of the evaluation value of the vertex of the graph by belief propagation is based, at least in part, on messaging among vertexes.

15. The detection method according to claim 8, wherein:
the updating updates the evaluation value on a basis of a message obtained by updating a vector, in which messages are arranged in belief propagation, using a matrix expressing a connection relationship of directed sides of a graph.

16. The detection method according to claim 8, wherein the matrix is a graph Laplacian matrix.

17. The detection method according to claim 8, wherein an order of the graph determines a number of sides extending from the vertex.

18. The detection method according to claim 8, wherein each vertex of the graph corresponds to a user.

19. The detection method according to claim 18, wherein a user corresponding to the vertex is a Sybil is determined based on the estimating of the label of the vertex.

20. The detection method according to claim 8, wherein the update of the evaluation value of the vertex of the graph by belief propagation is based, at least in part, on messaging among vertexes.

* * * * *